United States Patent [19]
Wiklund et al.

[11] 3,738,401
[45] June 12, 1973

[54] APPARATUS FOR SEVERING THE ROOT SYSTEM OF THE TREE FROM THE TRUNK DURING THE TREE-FELLING OPERATION

[75] Inventors: Per Martin Wiklund, Taby; Johan Ingemar Palm, Osterskar, both of Sweden

[73] Assignee: Ostbergs Fabriks AB, Alfta, Sweden

[22] Filed: Dec. 3, 1970

[21] Appl. No.: 94,731

[52] U.S. Cl.................... 144/34 R, 144/309 AC
[51] Int. Cl............................................. A01g 23/08
[58] Field of Search................. 144/2 N, 2 Z, 3 D, 144/34 R, 34 A–34 E, 309 AC

[56] References Cited
UNITED STATES PATENTS

| | | | |
|---|---|---|---|
| 3,536,113 | 10/1970 | Sutherland | 144/309 AC |
| 3,595,284 | 7/1971 | Landers | 144/2 Z |
| 2,535,099 | 12/1950 | Slick | 214/3 |
| 2,989,097 | 6/1961 | Bombardier | 144/2 Z |
| 3,443,611 | 5/1969 | Jorgensen | 144/2 Z |

*Primary Examiner*—Gerald A. Dost
*Attorney*—Young & Thompson

[57] ABSTRACT

An apparatus for severing the root system of a tree from the tree trunk during tree-felling comprising a gripping part, in operation being clamped to the trunk, and a cutting part for cutting of the roots. The cutting part includes a circular knife of interconnected knives arranged to encompass the trunk, and the cutting part is displaceable relative to the gripping part for cutting the roots, usually while pulling or pushing the tree upwards out of the ground in which part of the root system remains. Jacks or other power mechanism is used for moving the cutting part away from the gripping part fixed to the trunk. Timber is saved since no stump remains.

2 Claims, 5 Drawing Figures

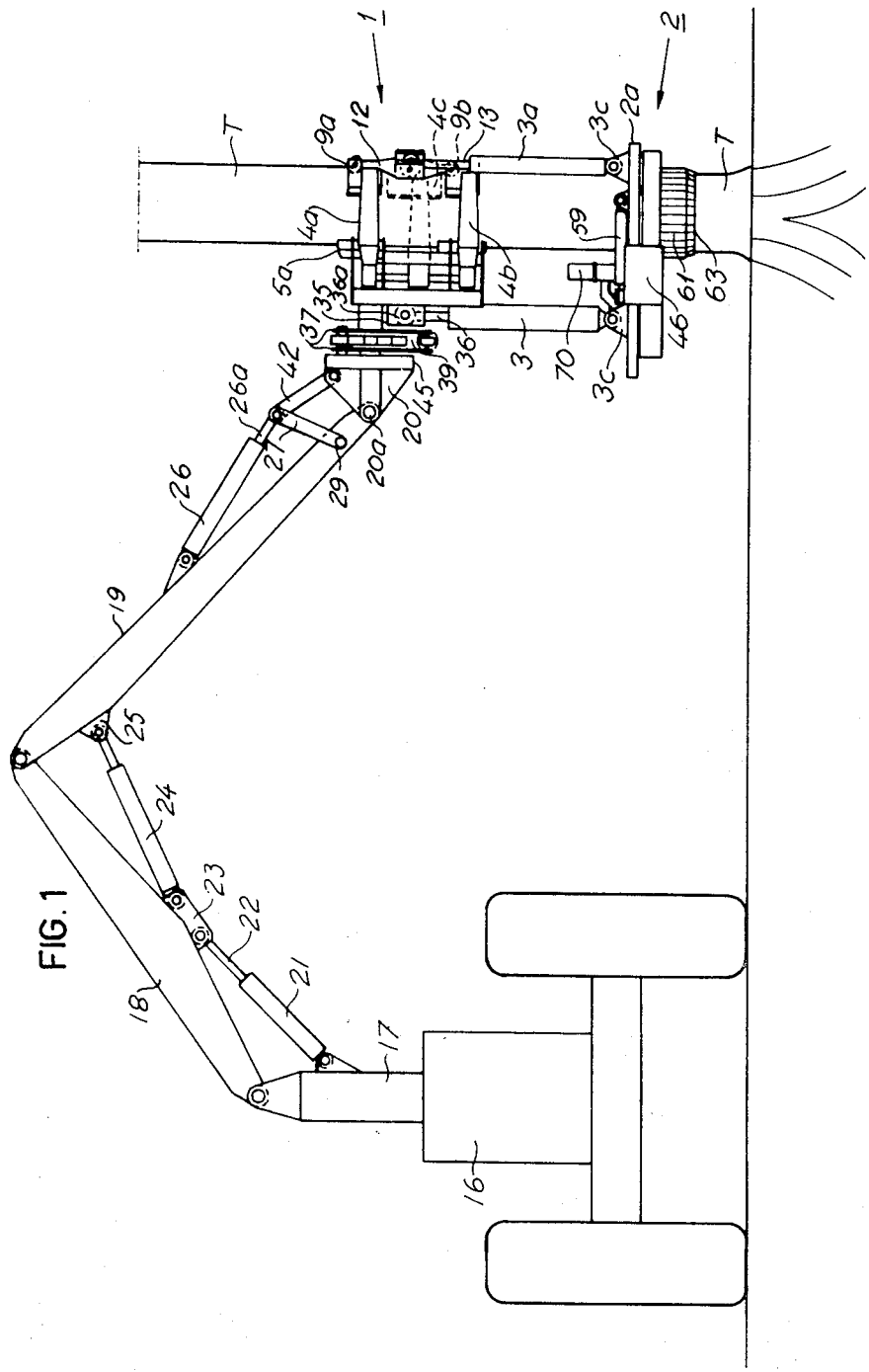

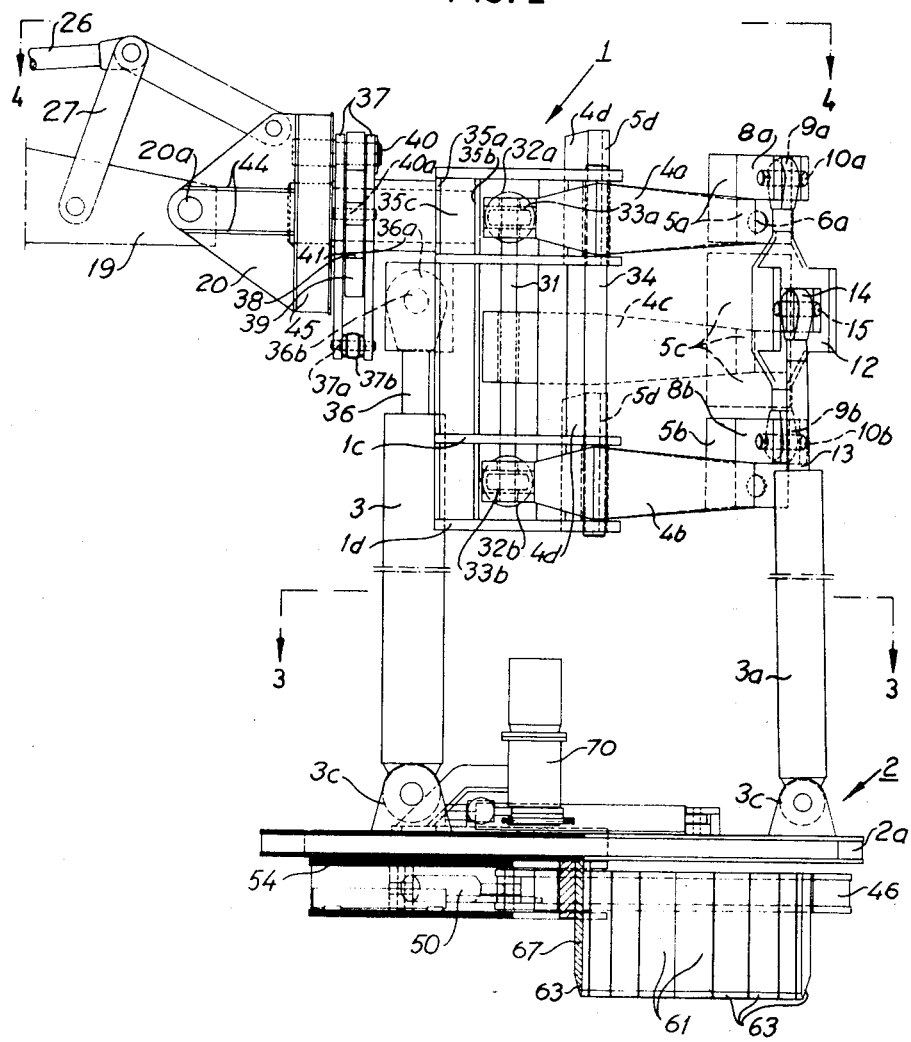

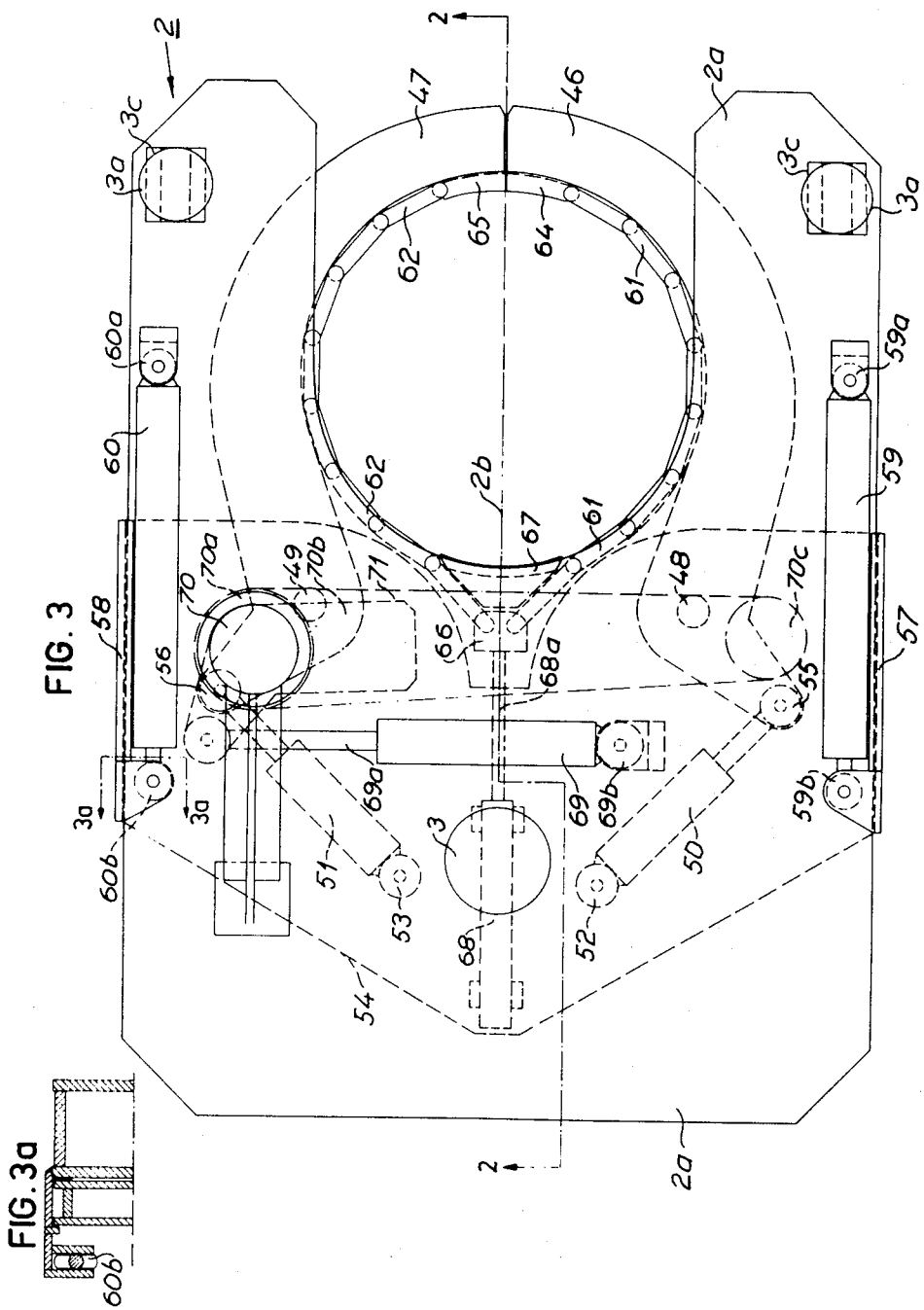

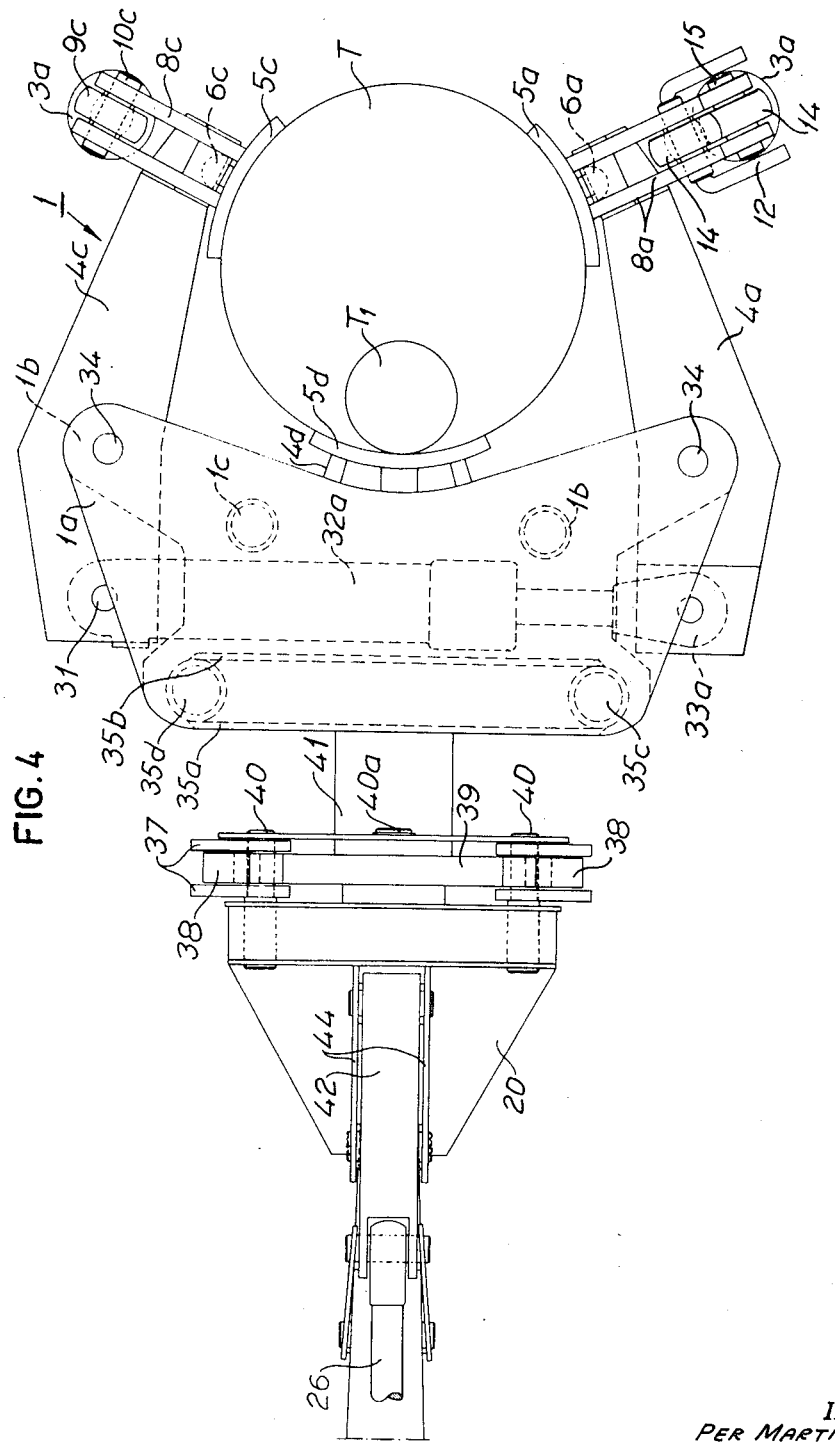

APPARATUS FOR SEVERING THE ROOT SYSTEM OF THE TREE FROM THE TRUNK DURING THE TREE-FELLING OPERATION

The present invention relates to an apparatus for severing the root system of the tree from the tree trunk during the tree-felling operation. The apparatus comprises a gripping part which is designed to be clamped to the tree trunk and a cutting part arranged to cut off roots. The apparatus is primarily intended to be mounted, e.g. on a crane arm of a tractor, or in a tree-felling machine or processor.

The main object of the invention is to make the apparatus so that it can recover the useful timber in the trunk extension down at and under the ground level, without having to pull the entire root system of the tree out of the ground.

The invention is mainly characterized in that the cutting part includes one or more cutting tools, in operative position mainly encompassing the trunk, the cutting part being displaceable, relative to the gripping part, along the trunk while the cutting tool(s) are kept in the position encompassing said trunk so that the roots are cut off by this displacement and in the extension of the trunk there remains a usable, increased end part of the trunk as merchantable timber.

The cutting part can be provided with or form a ground support which, during the extension of the cutting part along the trunk, rests on the ground, whereby continued extension of the cutting part with the grip part fixed to the trunk causes a thrust that lifts or tends to lift the trunk. Because of its shape, the cutting part, as such, can meet such strong resistance when pressed against the trunk encompassed ground that the tree is pulled out of the ground at the same time as the side roots are cut off. In this case, special ground support is dispensed with. For the movement of the trunk relative to the cutting part, it is possible to use a power mechanism having lifting means which rest on the ground and function to lift the tree or trunk during the operating of the cutting device. Alternatively, a power mechanism can operate between the gripping and cutting parts so that it can move the gripping and cutting parts away from each other after the gripping part has been clamped to the trunk. Said power mechanism produces the desired relative movement between the trunk and the cutting part.

The cutting part can be shaped as a closed ring or sleeve with one end edge shaped as a cutting edge. However, easier use is achieved if it is shaped like an open sleeve consisting, in principle, of two pivoted halves. Each half may consist of several cutting tools which form links in a cutting system. The cutting systems are preferably attached on arms which are movable during use towards and away from the trunk. In this way, the knife systems are brought by these arms to together encompass the tree trunk. A stretching device can communicate with the knife systems so that it can tighten said systems around the tree trunk.

Further characteristics of the invention are evident from the following description of an unit shown on the enclosed drawings. This unit constitutes an example of the applicability of the invention. FIG. 1 schematically shows the arrangement of the unit mounted on a crane arm; FIG. 2 shows a side view, partly in vertical section, of essential parts of the unit; FIG. 3 is a horizontal view substantially along the line III—III in FIG. 2, FIG. 3a is a vertical section of a component in FIG. 3 along the line III $a$ — III $a$ in FIG. 3, and FIG. 4 is a horizontal view of the gripping part, substantially along the line IV — IV in FIG. 2.

The unit comprises two main parts: a gripping part 1 and a cutting part 2. These parts are held together by one or more hydraulic cylinder units 3. The cutting part is placed at a lower level than the gripping part 1 and can be moved in relation to the gripping part 1 by means of the hydraulic cylinder unit 3.

The parts 1 and 2 are mounted as a unit on a crane arm which is movably supported by a tractor 16 or the like, for example pivotally on a crane shaft 17 on the tractor. The crane arm consists of a lifting arm 18 pivotally journalled in the crane shaft 17 in the vertical plane and flexibly connected to a lever arm 19. A hydraulic lifting cylinder 21 may be used to adjust the height of the lifting arm 18 and for this purpose cooperates with an attachment 23 on the arm, by means of its piston rod 22. Similarly, the lever arm 19 is vertically adjustable by means of a hydraulic rocker cylinder 24 flexibly connected to the attachment 23 and an attachment 25 on the lever arm. The lever arm 19 also flexibly carries a hydraulic, so-called tilt cylinder 26 whose piston rod 26a is flexibly connected to the lever arm 19 by means of a link 27 and by means of another link 42 to an attachment member 20 joined flexibly to the lever arm 19 about a peg 20a. This attachment member 20 belongs to the gripping part which will be described later.

The gripping part 1 comprises hydraulically operated gripping arms 4a, 4b, 4c, which grip the tree T and press it against a rear support 4d. The gripping arms 4a, 4b, 4c and the support 4d should have large contact surfaces or clamping plates against the surface of the tree so that considerable force may be exerted without the surface pressure being so great that the timber is crushed. The contact surfaces should also possibly be provided with horizontal ribs or the like to prevent the tree T from sliding axially in the gripping part.

The gripping arms 4a and 4b are placed at the top and bottom of the gripping part in approximately the same vertical plane and the gripping arm 4c at a level between these, whereas the support 4d is placed on the opposite side of the tree (see also FIG. 4). The curve distance between the gripping arms 4a, 4c and the support 4d is preferably about 120°. The gripping arms 4a, 4b, 4c are pivotally journalled about vertical shafts 34 so that they can be clamped against the tree T with the desired pressure by the action of hydraulic cylinders 32a, 32b which are flexibly joined to respective gripping arms 4a, 4b by piston-rod projections 33a, 33b. Clamping plates 5a, 5b, 5c at the ends of the gripping arms 4a, 4b and 4c, respectively, can thus be pressed against the surface of the tree T and adapted according to the thickness of the tree. FIG. 4 shows at T 1, that even a narrow tree trunk can be clamped. The support 4d with its clamping plate 5 is stationary and thus serves as abutment.

The hydraulic cylinder unit 3 comprises three hydraulic cylinders 3, 3a in the embodiment shown. The former has greater cross sectional surface than the latter two cylinders 3a. One of the weaker cylinders 3a is joined by means of its piston rod 13 and piston rod projection 14 with peg 15, to a yoke 12. This yoke is joined to arms 8a, 8b by means of pegs 10a, 10b and attachments 9a, 9b, similar to piston rod projections, the arms 8a, 8b being attached to the pressure plates 5a and 5b.

In this way, lifting force from one of the weak hydraulic cylinders 3a is transmitted through the yoke 12 to the clamping plates 5a, 5b. At the same time, a force is transmitted from the other weak hydraulic cylinder 3a via piston rod projection 9c, peg 10c and arms 8c to the clamping plate 5c. The forces from the gripping arms 4a, 4b and 4c are transmitted to the pressure plates 5a, 5b, and 5c via the ball joints 6a, 6b and 6c. The stronger hydraulic cylinder 3 transmits its force to the attachment 35 through a piston rod projection 36a and a peg 36b. The attachment 35 is rigidly attached to the construction formed by the plates 35a, 35b and the tubes 35c and 35d. The tubes 35c, 35d, 1c and 1f form, together with the plates 35a, 35b, 1a, 1b, 1c and 1d, the frame of the gripping part.

The force to the gripping arm 4c is transmitted from the cylinders 32a and 32b through the shaft 31 which is flexibly connected to the cylinder 32a and the cylinder attachment of the cylinder 32b and the gripping arm 4c. All of the three cylinders 3 and 3a are flexibly connected at their lower ends to the attachment 3c on a support plate 2a of the underlying cutting part 2. Thus, when the hydraulic cylinders 3, 3a are fed with pressure liquid, the cutting part 2 has a tendency to move downwardly and the gripping part 1 upwardly.

The cutting part 2 includes arms 46 and 47 pivotable about shaft pins 48 and 49, respectively. The swinging movement is effected with the help of hydraulic cylinders 50 and 51 arranged between attachments 52 and 53, respectively, on a movable carriage 54 and the attachments 55 and 56 on the arms 46 and 47, respectively. The carriage 54 moves in guides 57 and 58 and can be displaced forwards and backwards by hydraulic cylinders 59 and 60 which on one side are flexibly connected to attachments 59a, 60a on the support plate 2a and on the other side by means of their piston rods, to attachments 59b, 60b on the carriage 54.

In the gripping arms 46 and 47, respectively, are two knife systems 61 and 62, respectively, each consisting of links pivoted in relation to each other and having a cutting edge 63 facing down. The knife systems are attached at one end in end links 64 and 65, respectively, which are securely attached to the arms 46 and 47, respectively on the parts facing away from each other. At the other end the knife systems are flexibly connected to an attachment link 66 which is displaceable in the horizontal plane along the center plane 2b of the cutting part 2. This movement takes place in relation to the carriage 54 by means of a hydraulic cylinder 68 and its piston rod 68a in order to tauten the knife system 61 and 62 and thus ensure that the knife systems can effectively surround trees of varying diameter. A stationary, single-curved knife 67 with lower cutting edge 63 acts as abutment for the tree and also enables the tree to be completely surrounded by knife elements provided with cutting edges.

The cutting part is also provided with a suitable sawing or cutting device, shown here in the form of a so-called swinging bar with a saw chain 71 driven by a motor 70 suitably geared. This chain 71 runs over a chain wheel 70c and a chain wheel 70a driven by the motor, attached on a pivoting arm 70b, which is actuated by the piston rod 69a of a hydraulic cylinder 69 which is flexibly connected to an attachment 69b on the support plate 2a. The saw chain 71 can be moved towards the tree with the desired force, when actuated by the hydraulic cylinder 69.

The unit consisting of parts 1 and 2 is pivotable about a horizontal peg 41 (FIG. 2) so that said unit can be adjusted according to the slant of the tree. After adjustment, this turning movement is retarded by means of a braking device described below. The peg 41 is fixed in the frame (1a) of the gripping part 1 and supports a braking disc 39 which can cooperate with brake blocks 38 pivotably placed about pegs 40a on arms 37 which in turn are pivotable about a peg 40 and can be operated by means of a piston rod belonging to a hydraulic cylinder 37a and having a piston rod projection 37b to press the brake blocks 38 against the brake disc 39 or release them from this, respectively. The brake should be released and thus release the peg 41 when the units 1, 2 are required to be able to turn when the tree is gripped, and when it is released if the unit supporting the combination of parts 1 and 2 is sloping on its base. The peg 41 is journalled in a box 45 which is attached to the attachment member 20 provided with reinforcing flanges 44 and joined to the lever arm 19 through the peg 20a.

The felling unit operates in the following way:

The unit with the gripping arms 4a, 4b, 4c of the gripping part open and the cylinders 3, 3a, 50, 51, 59, 60 in withdrawn position and the cylinder 68 in extended position, is placed so that the tree is between the gripping arms 4a, 4b, 4c of the gripping part 1 and the arms 46 and 47 of the cutting part 2. When the tree is to be felled, the cutting part 2 shall be at such a level that the root swelling on the tree trunk does not make the trunk so conical that further transport, etc. of the timber is made difficult. The tree is then gripped, by the closing of the gripping arms 4a, 4b and 4c in the gripping part 1 and the arms 46 and 47 in the cutting part 2. Immediately after this, the carriage 54 is moved back until the links 64 and 65 and the knife 67 come into contact with the outer surface of the tree and the attachment link 66 is drawn back with the help of the cylinder 68 until the knife systems 61 and 62 are stretched and in abutment with the surface of the trunk.

Alternatively, the tree may first be encompassed by the cutting part 2 only, after which the entire unit is lowered as far as possible and the gripping arms 4a, 4b, 4c in the gripping part are closed.

The cylinders 3, 3a are then projected synchronously so that the cutting part 2 is pressed downwardly and the knife systems 61 and 62 with the cutting edges 63 (also on the knife 67) cut away the root swelling on the tree, and possibly also some of the side roots. When the cutting unit 2 has been moved towards the ground, the cylinders 3, 3a will gradually exert a contact pressure between the cutting part 2 and the ground on the one hand and the upwardly directed force against the gripping part 1 will be so great that the tree is pulled up out of the ground and its side roots will be cut off by the knife systems. The crane arms 18, 19 or a separate crane may possibly also assist with the lifting. When the unit operator judges that all the merchantable timber is above the horizontal plane where the pivotable bar, formed by the chain saw 71, is located, remaining roots are sawed off by the saw 71 which receives its feeding motion from the cylinder 69.

The felled tree is then handled in the grip of the gripping part 1 whereas most of the roots remain in the ground.

According to an alternative embodiment the vertical roots can be removed by means of two hydraulically driven knife- or scissor-like shanks which swing towards each other in the horizontal plane.

We claim:

1. Apparatus for severing the root system of a tree from the trunk thereof, comprising a gripping part for clamping the tree trunk, a cutting part displaceable below and relative to said gripping part, said cutting part including a knife edge directed downward away from said gripping part, and said cutting part also including a ground support, and power means to move said cutting part and said gripping part away from each other along the trunk in the gripping position thereof while said ground support rests on the ground to force said knife edges through the root system of the tree, thereby to produce an increased end part of the trunk as merchantable timber in the root extension of the trunk.

2. Apparatus as claimed in claim 1. and a cutting device that moves crossways to the tree trunk to cut off roots entrained by the tree trunk during the lifting of said trunk.

* * * * *